United States Patent
Patapoutian et al.

(10) Patent No.: US 11,568,895 B1
(45) Date of Patent: Jan. 31, 2023

(54) READ OFFSET CALIBRATION FOR ERROR RECOVERY

(71) Applicant: Seagate Technology LLC, Fremont, CA (US)

(72) Inventors: Ara Patapoutian, Hopkinton, MA (US); Zheng Wang, Louisville, CO (US); Jason Bellorado, San Jose, CA (US); William M. Radich, Berthoud, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/466,327

(22) Filed: Sep. 3, 2021

(51) Int. Cl.
*G11B 21/10* (2006.01)
*G11B 20/10* (2006.01)
*G11B 5/012* (2006.01)

(52) U.S. Cl.
CPC ............ *G11B 21/106* (2013.01); *G11B 5/012* (2013.01); *G11B 20/10388* (2013.01)

(58) Field of Classification Search
None
See application file for complete search history.

(56) References Cited

U.S. PATENT DOCUMENTS

| | | | |
|---|---|---|---|
| 45,890,307 | | 5/1986 | Jen et al. |
| 5,055,951 A | * | 10/1991 | Behr .................... G11B 21/081 |
| 5,383,071 A | * | 1/1995 | Sato ................... G11B 15/4678 |
| | | | 360/77.14 |
| 5,450,257 A | | 9/1995 | Tran et al. |
| 5,831,888 A | | 11/1998 | Glover |
| 5,930,211 A | | 7/1999 | Sasaki |
| 5,949,602 A | * | 9/1999 | Ishioka ................ G11B 5/5534 |
| | | | 360/77.06 |
| 6,108,153 A | | 8/2000 | Glover |
| 6,154,335 A | | 11/2000 | Smith et al. |
| 6,317,285 B1 | * | 11/2001 | Bi ......................... G11B 5/5534 |
| 6,429,994 B1 | * | 8/2002 | Le ..................... G11B 5/59688 |
| | | | 360/77.02 |
| 6,430,008 B1 | | 8/2002 | Trabert et al. |
| 6,515,818 B1 | * | 2/2003 | Harmer ............... G11B 5/59611 |
| | | | 360/77.02 |
| 6,567,489 B1 | | 5/2003 | Glover |
| 6,657,809 B2 | | 12/2003 | Ottesen et al. |
| 6,657,810 B1 | | 12/2003 | Kupferman |
| 7,245,449 B2 | | 7/2007 | Stein et al. |
| 7,307,808 B2 | | 12/2007 | Kaizu et al. |
| 7,885,025 B2 | | 2/2011 | Eppler et al. |
| 8,149,529 B2 | | 4/2012 | Mathew et al. |
| 8,917,475 B1 | | 12/2014 | Zhao et al. |

(Continued)

OTHER PUBLICATIONS

"Volterra series," Wikipedia, retrieved from "https://en.wikipedia.org/w/iridex.php?title=Volterra_series&oldid=1022344532," edited on May 10, 2021.

*Primary Examiner* — Peter Vincent Agustin
(74) *Attorney, Agent, or Firm* — Faegre Drinker Biddle & Reath LLP

(57) ABSTRACT

A method includes determining an error after attempting to read, via a first read transducer and a second read transducer, a data sector in a first data track. The method further includes calculating a weight ratio associated with the data sector and determining a read offset direction of the data sector based, at least in part, on the calculated weight ratio.

18 Claims, 14 Drawing Sheets

(56) References Cited

U.S. PATENT DOCUMENTS

| | | |
|---|---|---|
| 8,964,325 B1 | 2/2015 | Yamada |
| 9,001,452 B2 | 4/2015 | Daugela et al. |
| 9,019,642 B1 * | 4/2015 | Xia ................. G11B 20/10009 360/39 |
| 9,190,078 B2 | 11/2015 | Sapozhnikov et al. |
| 9,819,456 B1 * | 11/2017 | Bellorado ........ G11B 20/10009 |
| 9,953,673 B2 | 4/2018 | Daugela et al. |
| 10,008,229 B2 | 6/2018 | Galbraith et al. |
| 10,020,017 B2 | 7/2018 | Furuhashi |
| 10,255,943 B1 | 4/2019 | Schick et al. |
| 2002/0181347 A1 | 12/2002 | Ikeda et al. |
| 2006/0126460 A1 * | 6/2006 | Kobayashi ........... G11B 7/0945 369/47.1 |
| 2009/0168224 A1 * | 7/2009 | Sakai ................. G11B 5/59627 360/77.02 |
| 2009/0257333 A1 | 10/2009 | Kikuchi |
| 2010/0097714 A1 | 4/2010 | Eppler et al. |
| 2017/0061997 A1 | 3/2017 | Furuhashi |
| 2017/0194024 A1 | 7/2017 | Galbraith et al. |

* cited by examiner

READ OFFSET CALIBRATION FOR ERROR RECOVERY

SUMMARY

In certain embodiments, a method includes determining an error after attempting to read, via a first read transducer and a second read transducer, a data sector in a first data track. The method further includes calculating a weight ratio associated with the data sector and determining a read offset direction of the data sector based, at least in part, on the calculated weight ratio.

In certain embodiments, a hard disk drive includes a magnetic recording medium comprising data sectors along a data track, a read/write head including a first read transducer and a second read transducer, and an integrated circuit with circuitry. The circuitry is programmed to: calculate a weight ratio that is (1) associated with a first data sector and (2) based on signals generated by the first read transducer and second read transducer, and cause adjustment of a position of the read/write head based, at least in part, on the calculated weight ratio.

In certain embodiments, a system-on-a-chip (SOC) includes a read/write channel and a servo controller. The read/write channel is configured to: calculate a weight ratio for each data sector of a data track, detect an error in reading a first data sector of the data sectors, calculate an average weight ratio for the data track, and compare the calculated average weight ratio to the calculated weight ratio associated with the first data sector. The servo controller is configured to cause adjustment of a position of a read/write head in response to the comparison.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
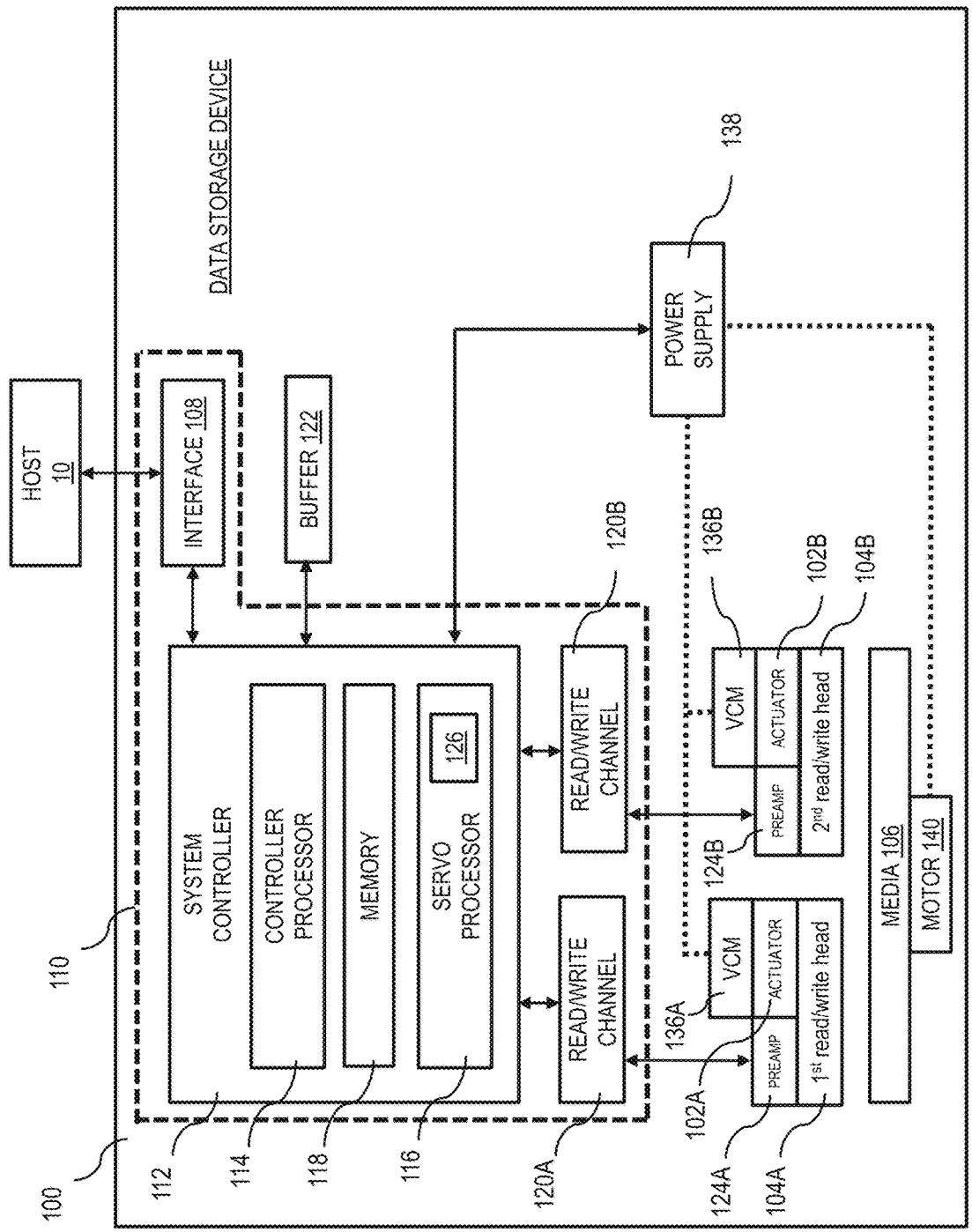
FIG. 1 shows a block diagram of a data storage device, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

When a hard disk drive is initially unable to successfully read data from data sectors on a magnetic recording medium, the hard disk drive identifies the error and tries to read the missed data sectors again. This process of identifying the error and re-reading the missed data sectors is sometimes called error recovery. Re-reading the missed data sectors can be challenging because one common cause for missing data sectors is that the missed data sectors may be misaligned or offset from the center of the data track. As such, following the same path along the center of the data track may result in missing the same data sectors again. Certain embodiments of the present disclosure are accordingly directed to methods and devices for error recovery.

FIG. 1 shows a schematic of a data storage device 100 such as a hard disk drive. In the case of a hard disk drive, the data storage device 100 can include multiple actuators (i.e., a first actuator 102A and a second actuator 102B) each with one or more read/write heads 104A and 104B to provide concurrent access to magnetic recording media 106 (e.g., magnetic recording disks, which are referred to as a magnetic recording medium in singular form). In certain embodiments, the multiple actuators 102A and 102B share a common pivot axis and are positioned in a stacked arrangement. In such embodiments, the read/write head(s) 104A coupled to the first actuator 102A access different surfaces of the magnetic recording media 106 than the read/write head(s) 104B coupled to the second actuator 102B. In other embodiments, the multiple actuators 102A and 102B have separate pivot axes. In such embodiments, the read/write head(s) 104A coupled to the first actuator 102A can access the same magnetic recording medium 106 as the read/write head(s) 104B coupled to the second actuator 102B. Although only two actuators for the data storage device 100 are shown in FIG. 1, additional actuators can be incorporated into the data storage device 100 or the data storage device 100 may have only one actuator.

The read/write heads 104A and 104B can each comprise a slider with one or more read transducers (e.g., readers, read head) and one or more write transducers (e.g., writers, write head). In the embodiments described in more detail below, each read/write head includes two read transducers.

The data storage device 100 includes an interface 108 (e.g., an input/output interface) for transferring data to and from the data storage device 100. For example, the interface 108, among other features, can be communicatively coupled between a host 10 (e.g., a laptop, a personal computer, or a data storage system such as a server) and the read/write heads 104A and 104B to facilitate communication, using a standardized communication protocol (e.g., SATA, SAS, SCSI), between the read/write heads 104A and 1046 and the host 10.

The data storage device 100 can include a system on a chip ("SOC") 110 (shown in dashed lines) that includes a system controller 112, which can include a controller processor 114 (e.g., a microprocessor), a servo processor 116 (e.g., a microprocessor), and memory 118 coupled to the controller processor 114 and the servo processor 116. The SOC 110 can include multiple distinct banks of memory. For example, one bank of memory 118 can be dedicated to the controller processor 114 and its functions while another bank of memory 118 can be dedicated to the servo processor 116 and its functions (e.g., the memory 118 and the servo processor 116 together functioning as a servo controller 126). The interface 108 may also be part of the SOC 110.

The SOC 110 can also include one or more read/write channels 120A and 120B, which encode and decode data associated with write commands and with read commands. The SOC 110 may be an integrated circuit such as an application-specific integrated circuit ("ASIC") and field-programmable gate array ("FPGA") that includes instructions (e.g., in the form of firmware) for carrying out various functions of the data storage device 100. For example, the SOC 110 can include circuitry to control and carry out various aspects of the data storage device 100 as described in more detail below. Although the interface 108, system controller 112, etc., are shown as being part of a single SOC, the components and their functions can be distributed among several integrated circuits. The system controller 112 can be coupled to and control access to a buffer 122, which can temporarily store data associated with read commands and write commands. The buffer 122 can be a volatile memory, such as a dynamic random access memory ("DRAM"), static random access memory ("SRAM"), or other volatile memory.

During operation, the data storage device 100 receives various data transfer commands (e.g., a read command or a write command) from the host 10. Data associated with a write command may be received from the host 10 by the interface 108 and initially stored to the buffer 122. The data is encoded or otherwise processed by respective read/write channels 120A or 120B and eventually stored to the magnetic recording media 106 via one of the read/write heads 104A or 1046 coupled to the respective first actuator 102A or the second actuator 102B. Data associated with a read command may be retrieved from the magnetic recording media 106, processed by one of the read/write channels 120A or 120B, and stored in the buffer 122. Such data is then transferred to the host 10 by the interface 108. In certain embodiments, the servo processor 116 controls operations of respective pre-amplifiers 124A and 124B, which provide signals to the respective read/write heads 104A and 104B for writing magnetic transitions to the magnetic recording media 106 and for receiving signals from the respective read/write heads 104A and 104B in response to detecting magnetic transitions written to the magnetic recording media 106.

Figure 2:
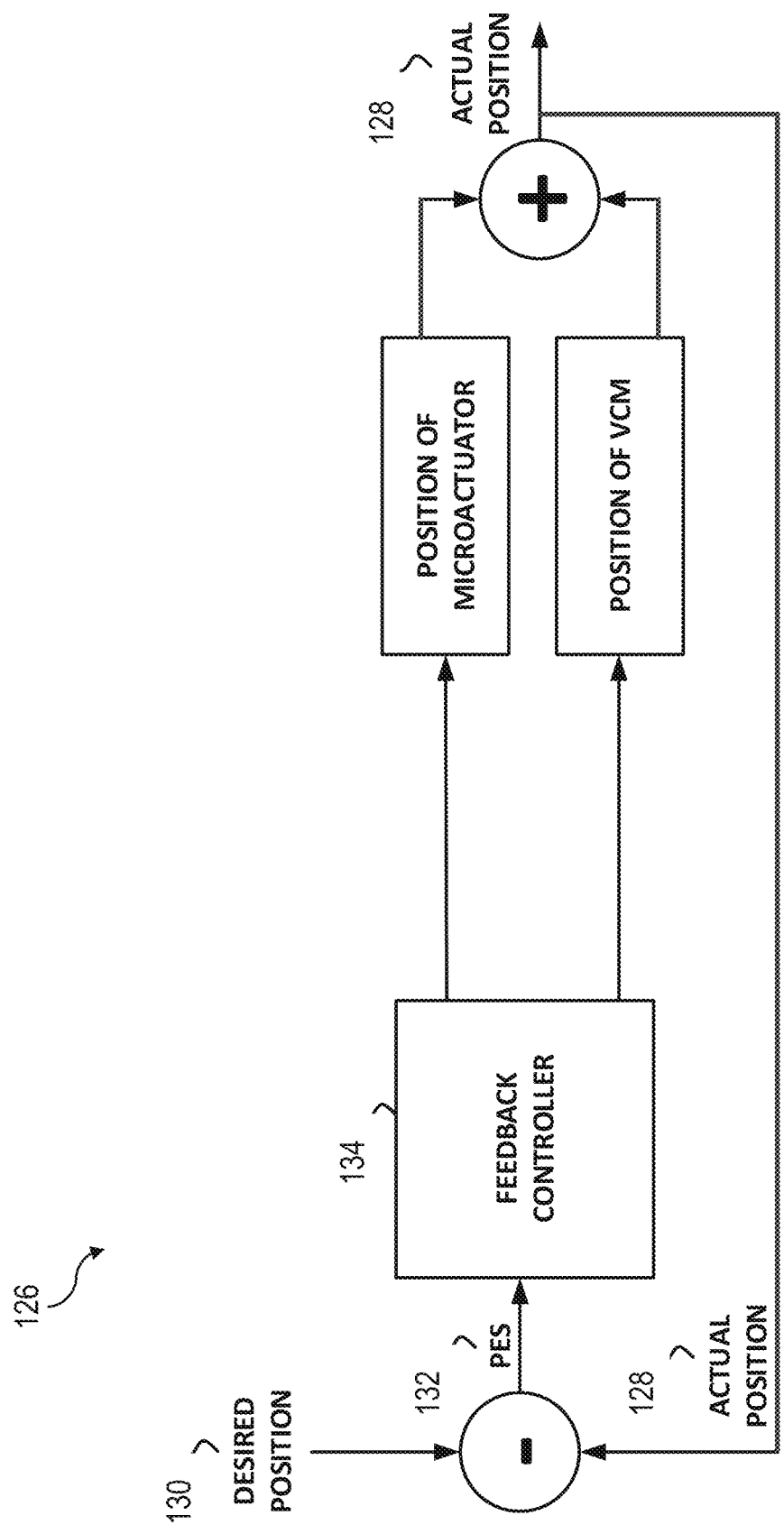
FIG. 2 shows a diagram of a servo control system, in accordance with certain embodiments of the present disclosure.

The data storage device 100 includes a servo controller 126 (schematically shown in more detail in FIG. 2) that is carried out by components of the system controller 112 (e.g., the servo processor 116 and one or more banks of the memory 118). In operation, the read/write heads 104A and 104B read the positioning data from servo sectors stored on the magnetic recording media 106. The read positioning data is processed to determine an actual position 128 (shown in FIG. 2) of the read/write heads 104A and 1046 relative to tracks on the magnetic recording media 106.

The actual position 128 of the read/write heads 104A and 104B is subtracted from a desired position 130 of the read/write heads 104A and 104B to determine a position error signal (PES) 132 (shown in FIG. 2), which is the difference between where the read/write heads 104A and 104B are and should be positioned. The PES 132 is fed into a feedback controller 134, which controls current to at least one of the voice coil motor (VCM) assemblies 136A, 136B and—for some operations—controls voltage to microactuators to position the read/write heads 104A and 104B over the desired track. This PES is generated from reading data in the servo sectors as opposed to reading data in the data sectors.

As shown in FIG. 1, the data storage device 100 includes a power supply 138, (e.g., an amplifier) which is controlled by the system controller 112. The power supply 138 supplies current to a motor 140 (e.g., spindle motor), which rotates the magnetic recording media 106. The power supply 138 also supplies current to VCM assemblies 136A and 136B. In certain embodiments, the power supply 138 is an integrated circuit, which includes electronics (e.g., voice coil driver electronics) designed to provide current to the VCM assemblies 136A and 1366.

The VCM assemblies 136A and 136B are used to position (e.g., rotate) the actuators 102A and 1026 to position the read/write heads 104A and 1046 over a desired data track on the magnetic recording media 106 for data reading and data writing operations. For example, in response to a command to read data from or write data to a data track located a certain distance away from where a respective read/write head 104A or 104B is currently positioned (i.e., a track-seeking operation), a current may be supplied by the power supply 138 and applied to the voice coil of the respective VCM assemblies 136A and 136B to rotate the respective actuators 102A and 102B (and therefore the respective read/write heads 104A and 104B) towards the desired data track. The applied current through the coil generates a magnetic field that interacts with magnets of the VCM assemblies 136A and 136B. The applied current may follow a current profile determined by and commanded by the servo processor 116. As the respective read/write heads 104A and 1046 near the desired data track, less current is applied to the VCM assemblies 136A and 1366 such that the read/write heads 104A and 1046 begin to settle over the desired data track (i.e., a track-settling operation). Once the respective read/write heads 104A and 104B are positioned over the desired data track, the servo controller 126 compensates for small positioning errors (i.e., a track-follow operation) to keep the desired read/write heads 104A and 104B over the desired data tracks on the magnetic recording medium 106 during a read operation or a write operation.

Figure 3:
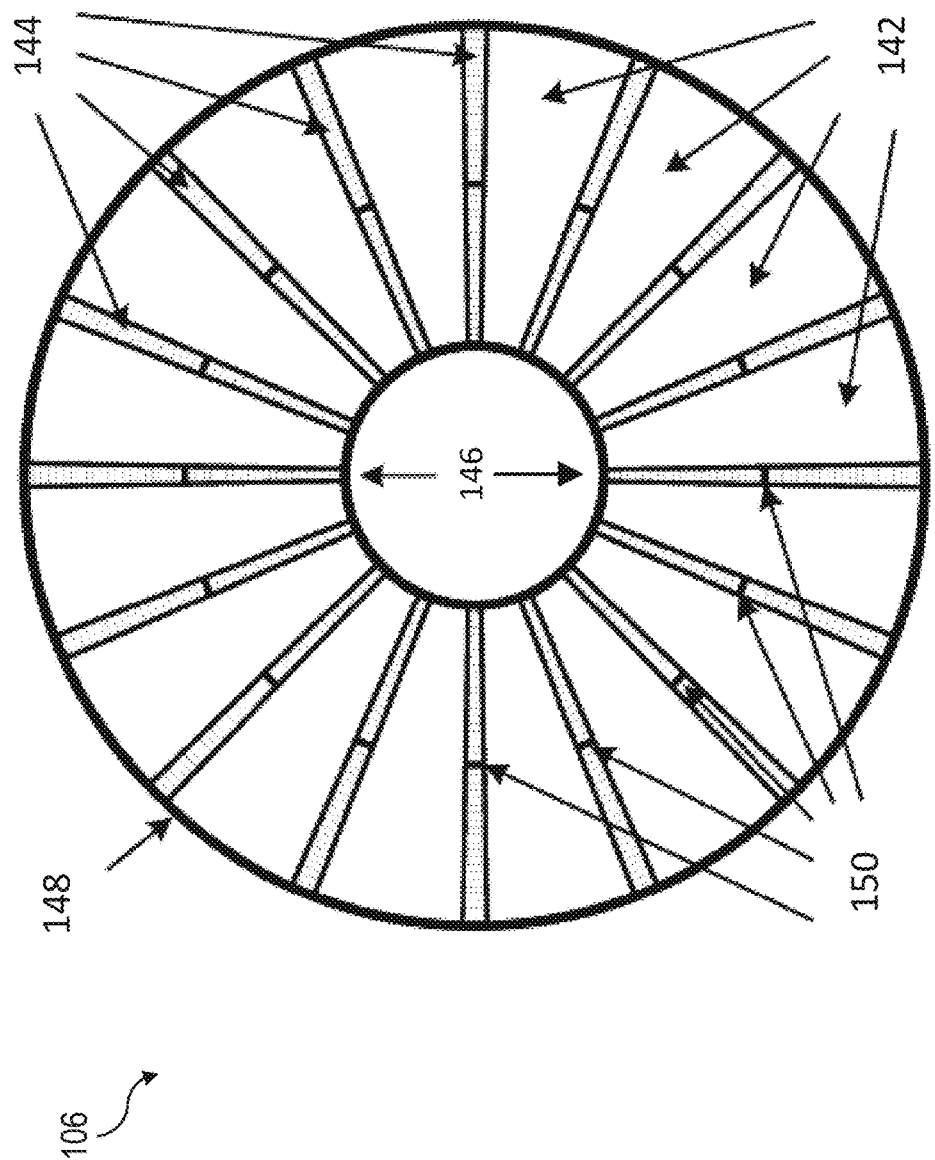
FIG. 3 shows a magnetic recording medium, in accordance with certain embodiments of the present disclosure.

FIG. 3 shows a top view of one side of one of the magnetic recording media 106. Data is written to the magnetic recording medium 106 along tracks, which may be sequentially numbered in accordance with their radial position. For example, track zero may be located adjacent to an outer diameter of the magnetic recording medium 106 and a last track may be located adjacent to an inner diameter of the magnetic recording medium 106.

The tracks of the magnetic recording medium 106 can include user data regions 142 and servo data regions 144 (which are sometimes referred to as servo wedges) positioned between the user data regions 142. The servo wedges 144 extend radially between an inner diameter 146 and an outer diameter 148 of the magnetic recording medium 106. Data on the magnetic recording media 106 is stored on data tracks which extend circumferentially around the top/bottom surfaces of each magnetic recording medium 106. The portion of the data tracks in the user data regions 142 store user data, and the portion of the data tracks in the servo wedges 144 are comprised of individual servo sectors 150 (some of which are shaded in FIG. 3), which store servo data. As such, each servo wedge 144 includes a plurality of servo sectors 150. As shown in FIG. 3, the servo wedges 144 can be positioned at regular intervals around the magnetic recording medium 106. In some embodiments, the magnetic recording medium 106 may have on the order of hundreds (e.g., 200) of servo wedges 144.

Figure 4:
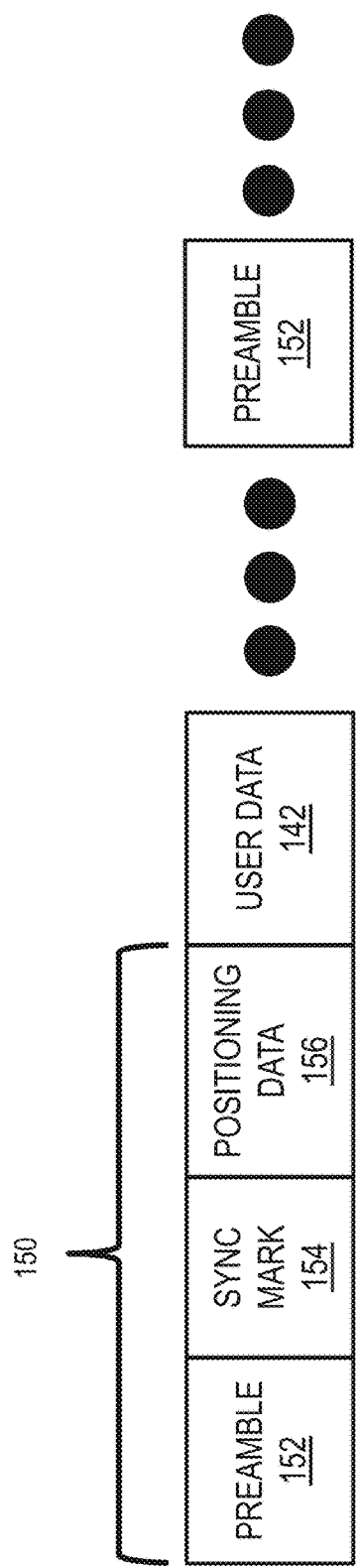
FIGS. 4 and 5 show partial, ribbon schematics of a data track, in accordance with certain embodiments of the present disclosure.

FIG. 4 shows an example of the type of servo data stored to the servo sectors 150. The servo sectors 150 can include a preamble 152 (e.g., a fixed pattern indicating the beginning of the servo sector 150) followed by what may be referred to as a sync mark 154 (e.g., a synchronization pattern) or a servo timing mark. For example, the preamble 152 may be written with an alternating pattern of magnetic transitions which, when read, generates a sine-wave like read-back signal. When the servo control system identifies the preamble 152, the servo control system may then search for an expected sync mark 154. Once the sync mark 154 is detected, the servo control system can then read positioning data 156 following the sync mark 154 from the servo sectors 150. The positioning data 156 specifies the physical radial and tangential location of the given servo sector 150 on the magnetic recording medium 106. As the read/write heads 104A and 104B pass over each servo sector 150, the servo sector's information is demodulated such that the position of the read/write heads 104A and 104B is known. The detected actual position of the read/write heads 104A and 1046 is used by the servo controller 126 to determine and correct when the actual position is suboptimal.

Servo data is written to both sides of the magnetic recording medium 106 by, for example, a servo writer or disk writer before the magnetic recording medium 106 is installed in the data storage device 100 or by the data storage device 100 itself using a process referred to as self-servo track writing (SSW) or concentric SSW process. SSW may include using the electronics (e.g., the SOC 110) of the data storage device 100 to write the concentric servo sectors independent of an external servo writer.

The read/write channels 120A and 120B, the preamplifiers 124A and 124B, and various components of the system controller 112 operate so that the servo data read by the read/write heads 104A and 104B can be processed and used by the data storage device 100 to maintain proper positioning of the read/write heads 104A and 104B.

Figure 5:
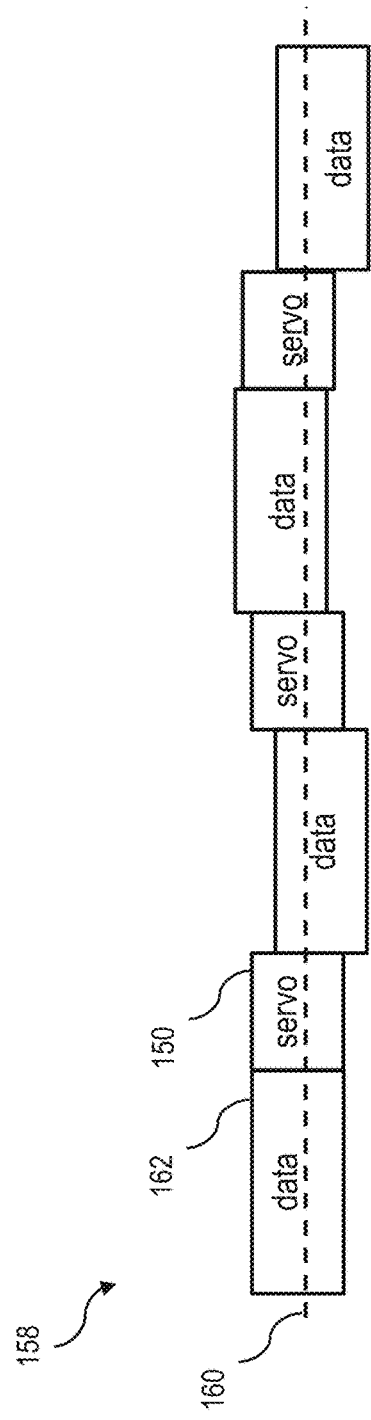

FIG. 5 shows a partial, ribbon view of a data track 158 for the magnetic recording medium 106. The magnetic recording medium 106 may have millions of data tracks stored on it. The data track 158 has a centerline 160. In some embodiments, the centerline 160 is the average centerline of data sectors along the data track 158. The data track 158 includes data sectors 162 positioned between the servo sectors 150. Many data sectors 162 can be positioned along the data track 158 in the section with the user data regions 142 (shown in FIGS. 3 and 4). As such, there can be multiple distinct data sectors 162 (e.g., data sectors with unique addresses) positioned between the servo sectors 150 along the data track 158.

As shown in FIG. 5, at least some of the data sectors 162 and servo sectors 150 may be offset (e.g., radially offset) from the centerline 160 of each data track 158. For example, the centerline of a given sector may be offset from (e.g., not aligned with) the centerline 160 of the data track 158. As noted above, the misalignment may cause errors when attempting to read data from the misaligned data sectors 162.

Figure 6:
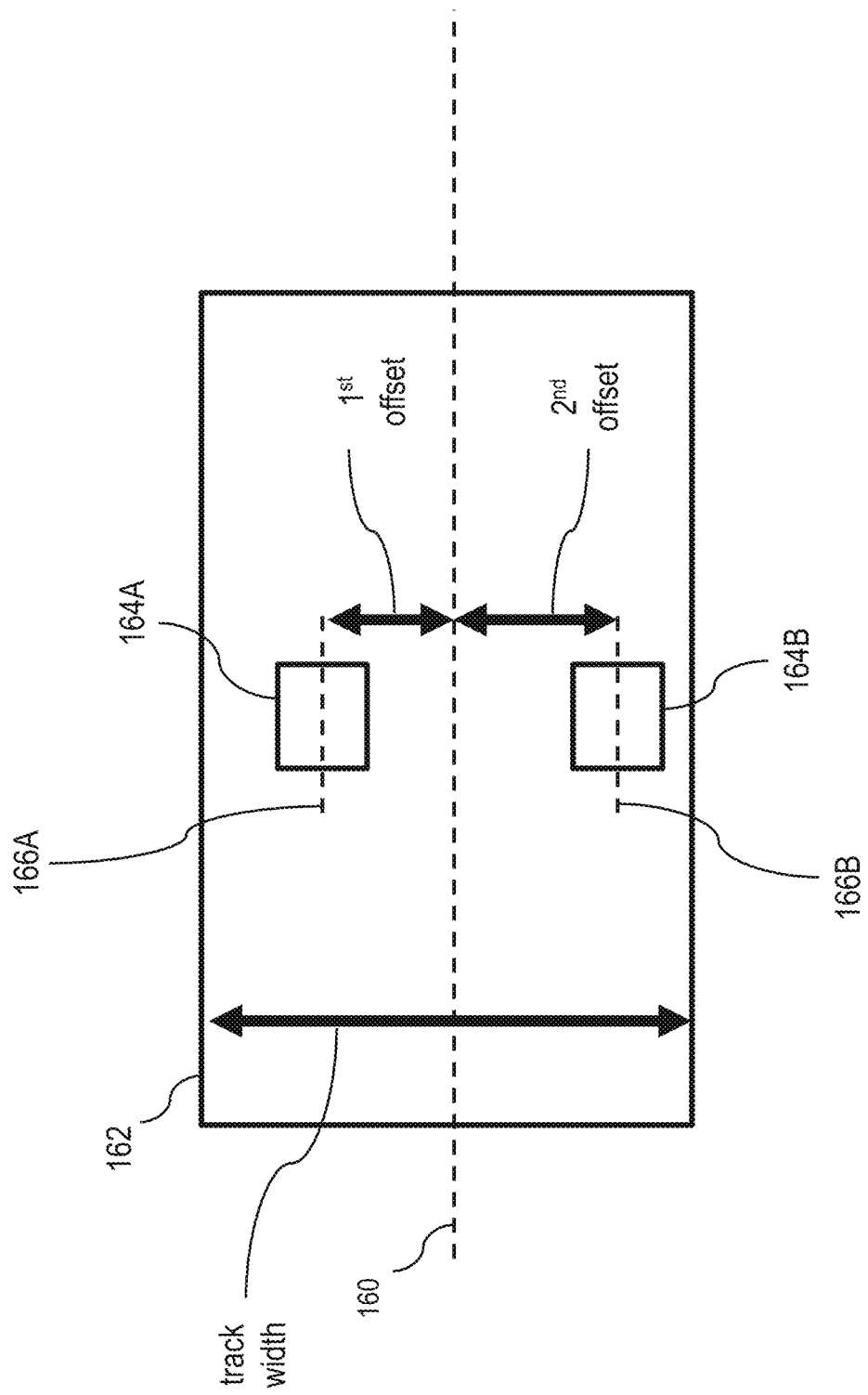
FIG. 6 shows a data sector and a read transducer, in accordance with certain embodiments of the present disclosure.

FIG. 6 shows one data sector 162 with a first read transducer 164A and a second read transducer 164B positioned over the data sector 162. The first read transducer 164A and the second read transducer 164B can be positioned on the same slider but are offset from each other along the width of the track (or radially along the magnetic recording medium). The first read transducer 164A has its own centerline 166A, and the second read transducer 164B has its own centerline 166B.

Due to symmetry of the first read transducer 164 and the second read transducer 164B and the distance of the two transducers, there is a position—with respect to each data sector—wherein bit-error rates (BER) are minimized. Deviating from this position results in higher BER and lower signal quality.

Complicating reading and writing is the fact that the read transducers 164A and 164B and write transducer are physically separate and therefore physically offset from each other. As a result, there is some natural misalignment between data being written on one data track and the servo data being read from another data track.

Figure 7:
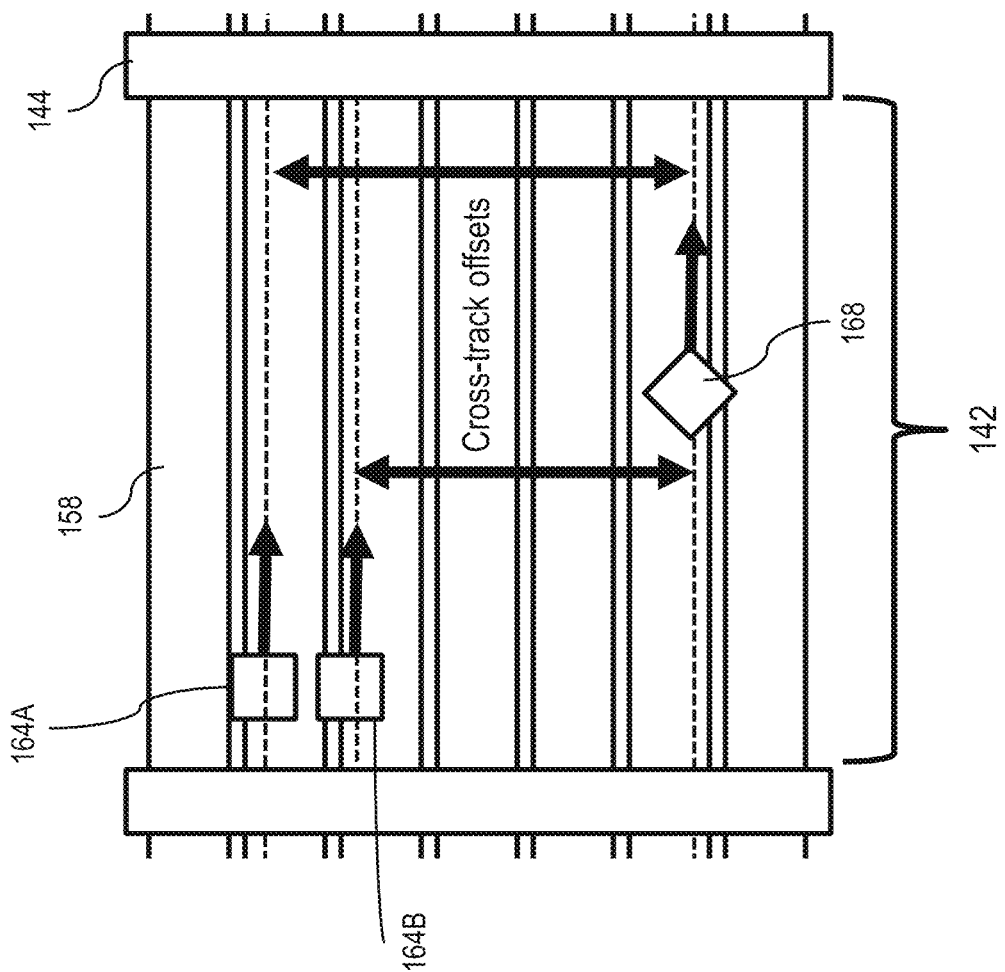
FIG. 7 shows multiple data tracks, multiple read transducers, and a write transducer, in accordance with certain embodiments of the present disclosure.

FIG. 7 shows an example of the physical offset between the first and second read transducers 164A and 164B and a write head 168. The first and second read transducers 164A and 1646 and the write head 168 are offset from each other in a cross-track direction (e.g., radially with respect to the magnetic recording medium 106) and an on-track direction (e.g., circumferentially). For example, the first and second read transducers 164A and 164B may be offset from the write head 168 by multiple data track widths. As a result, the first and second read transducers 164A and 1646 read servo data from one data track while the write head 168 is positioned over another data track. This offset can cause the write head 168 to write data sectors that are offset from the centerline of the data track. And, the offset is not detected until the first and second read transducers 164A and 164B attempt to read the written data. Therefore, hard disk drives can apply various techniques to compensate for data sectors written off-center or offset from the centerline of its data track.

Figure 8:
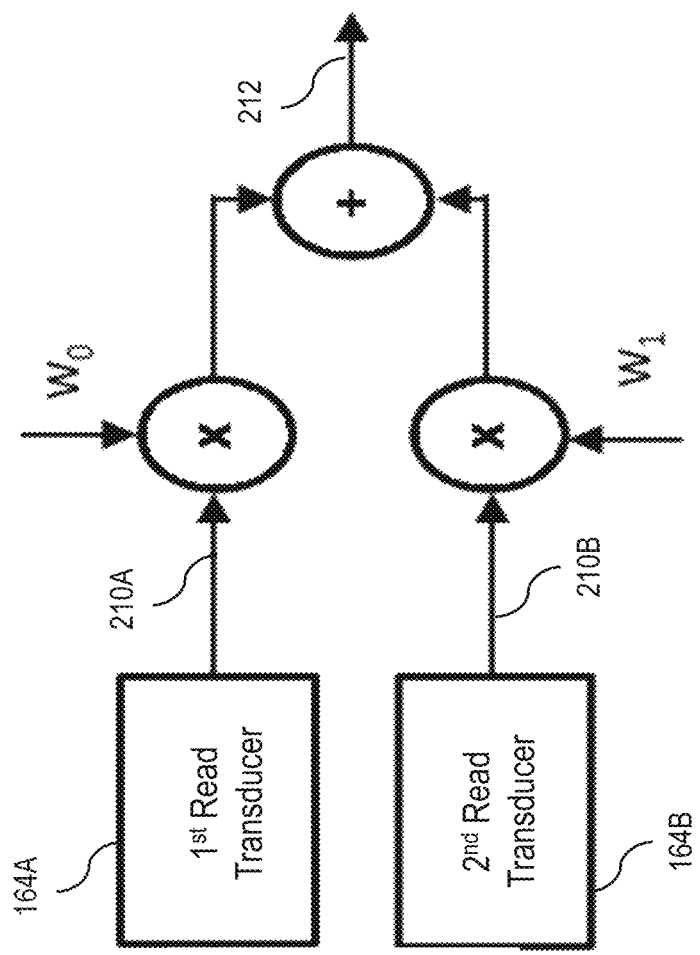
FIG. 8 shows a schematic of an approach weighting signals from multiple read transducers, in accordance with certain embodiments of the present disclosure.

FIG. 8 shows representations of each read transducer's signal 210A and 2106. These signals are created by converting the read transducers' (continuous) analog signals into digitized sample sequences. These signals are assigned a weight, denoted by $w_0$ and $w_1$. The individual weights determine the contribution of each read transducer's signal 210A and 210B to a final, combined signal 212—which ultimately is used by the read/write channel to process for reading/decoding the data stored to the magnetic recording media. These weights may be adapted based on a least-squares criterion as well as on a target to which the combined signal is attempting to match. As a result, a higher weight will be assigned to the read transducer signal with better quality (e.g., lower signal-to-noise ratio) compared to the other read transducer signal. As a result, the values of these weights may be dynamically adapted and may be a proxy/indication of the magnitude of each read transducer's deviation from the track center.

If $w_0^s$ and $w_1^s$ represent the weights of the first read transducer 164A and second read transducer 164B, respectively, for sector $s \in \{1, 2, \ldots, N\}$, then the weight ratio, $\omega^s$, of sector s is as follows:

$$\omega^s = w_0^s/(w_0^s + w_1^s). \quad (1)$$

The weight ratio can be averaged over all sectors within a data track. The average weight ratio, $\omega_{track}$, of a given data track can be defined as follows:

$$\omega_{track} = \frac{1}{N}\sum_{s=1}^{N}\omega^s. \quad (2)$$

The $\omega_{track}$ value can be obtained by averaging the weight ratio of individual sectors, i.e., $\omega^s$. For each sector, $\omega^s$ is calculated by Equation (1) and then averaged or adapted throughout the data track. In certain embodiments, the $\omega_{track}$ value is based on a subset of all data sectors of a given data track.

An alternative approach is to individually calculate/adapt $$w_{i,track} = \frac{1}{N}\sum_{s=1}^{N}w_i^s, \text{ for } i = \{0, 1\}.$$

The $\omega_{track}$ is then calculated as $\omega_{track}=w_{0,track}/(w_{0,track}+w_{1,track})$ In certain embodiments, instead of immediately stopping a read operation upon detecting an error, an entire data track can be read continuously regardless of whether a failed data sector is detected. As the data track is read, the $\omega_{track}$ value can be calculated—regardless of whether a failed data sector is detected.

Figure 9:
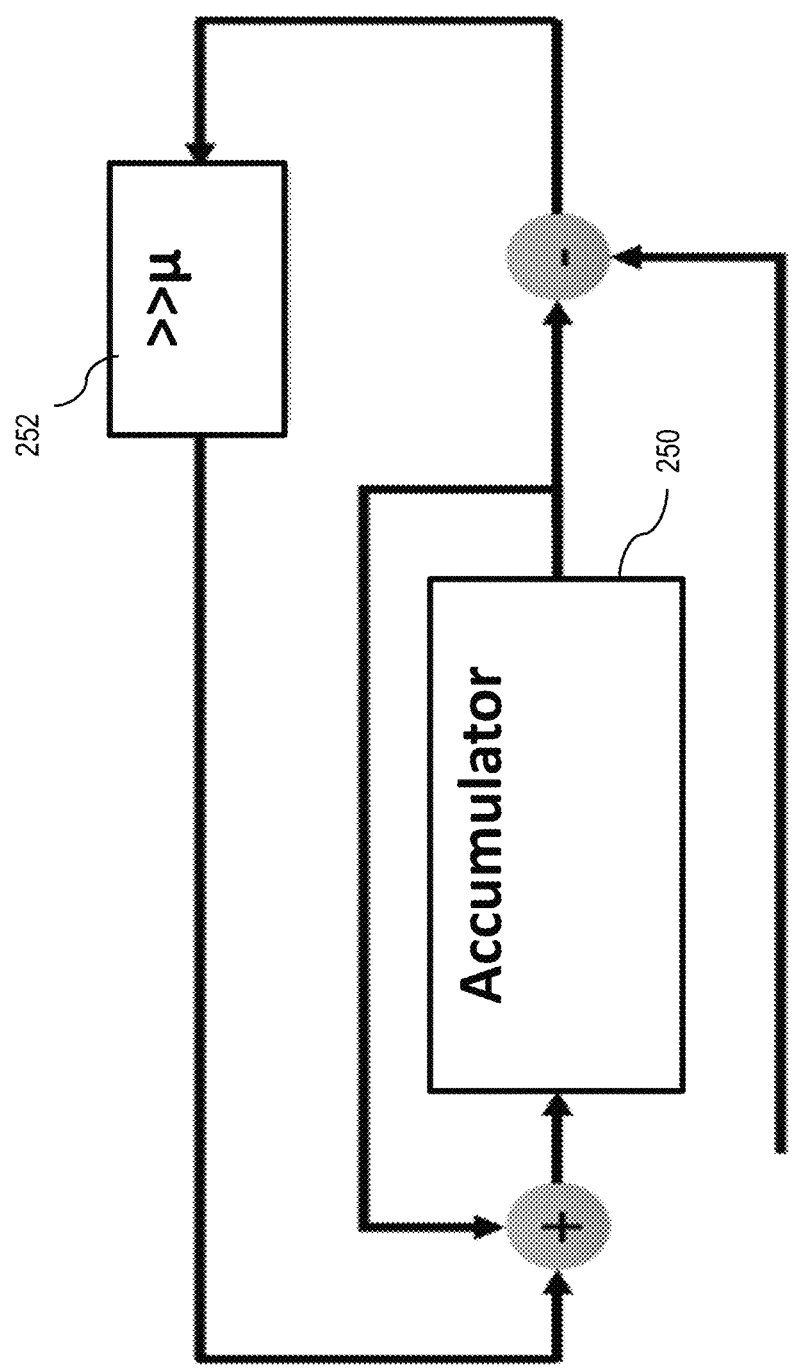
FIG. 9 shows a schematic of an approach for calculating weight ratio values on-the-fly, in accordance with certain embodiments of the present disclosure.

Using one approach, the $\omega_{track}$ value can be continuous updated/adapted while the read transducers are sensing (e.g., reading) data from data sectors along the data track. This approach is outlined in FIG. 9. An accumulator 250 starts with the weight ratio, $\omega^s$, of sector s of the first read data sector on the current data track. When weight ratio, $\omega^s$, of a newly read data sector is available, the weighted difference between the current weight ratio, $\omega^s$, and the current $\omega_{track}$ value (determined by block μ 252) is used to update the accumulator 250. In another approach, weight ratios $\omega^s$, of all the data sectors within the data track are stored and then averaged at the end by applying Equation (2) above.

Figure 10:
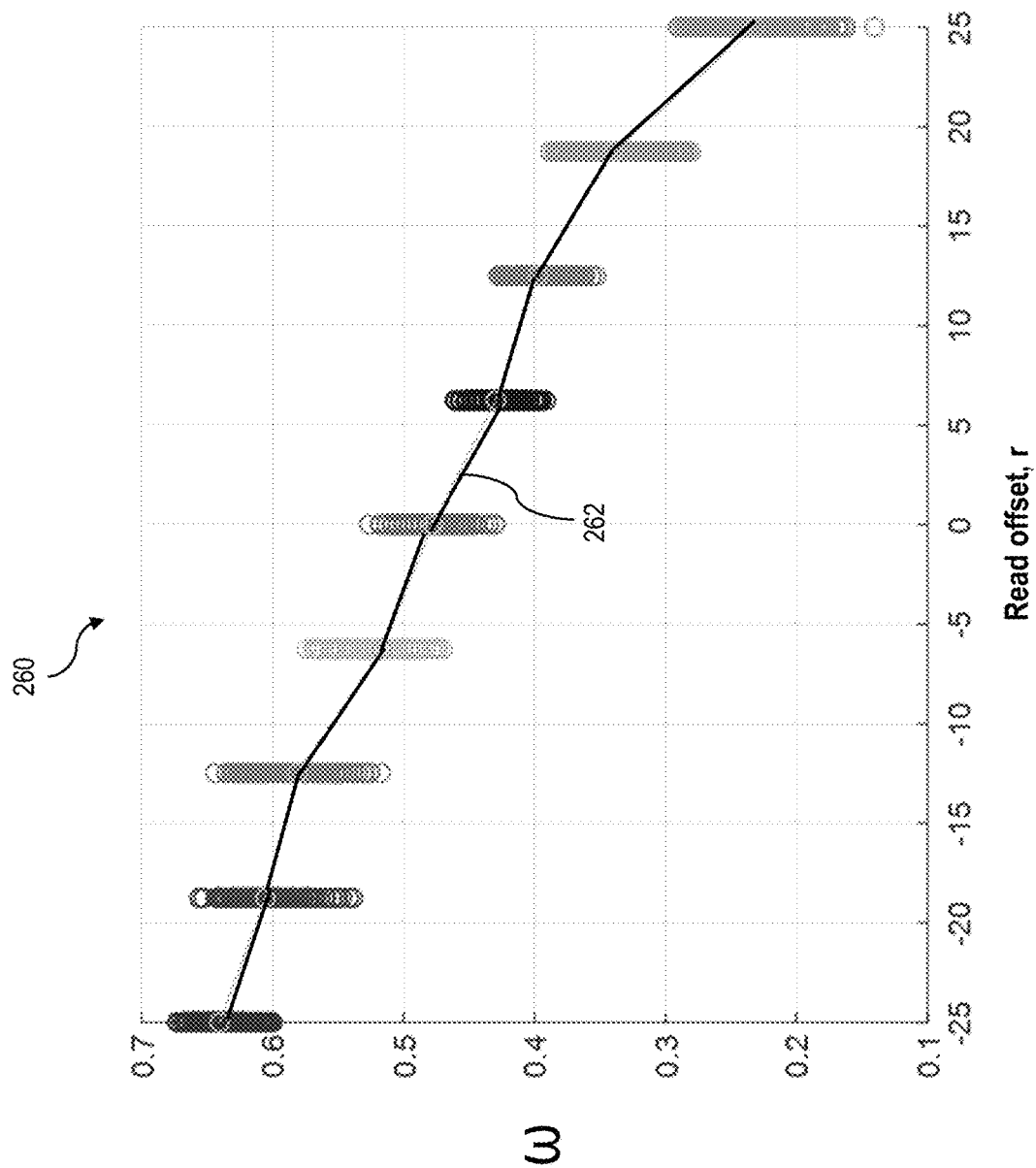
FIG. 10 shows a graph of plots of weight ratio values and read offset values, in accordance with certain embodiments of the present disclosure.

FIG. 10 shows a graph 260 of example data points showing a correlation between weight ratio, $\omega$, on the y-axis and read offsets, r, on the x-axis. The pair (r, $\omega^{(s,r)}$) represents each data point in FIG. 10. For a read offset value, r, a track level average weight ratio can be obtained by $$\omega_{track}^r = \frac{1}{N}\sum_{s=1}^{N}\omega^{(s,r)}.$$

The line 262 connects the $\omega_{track}^r$ values. The monotonicity between $\omega_{track}^r$ and the read offset shown in FIG. 10 can be used to estimate read offsets for dual-reader embodiments.

As shown in FIG. 10, the read offset value is 0 when the weight ratio is approximately 0.50 (or 50%). A weight ratio of 0.50 indicates that the first and second read transducers 164A and 164B are symmetric/identical and equally offset from the center of the data track. However, if the first and second read transducers 164A and 164B are not perfectly symmetric, the weight ratio at read offset value 0 will vary above or below 0.50.

The average weight ratio for a data track, $\omega_{track}$ defined in Equation (2) can represent the weight ratio when a given read/write head is located at zero offset. After reading a data track, or a portion of it, if one or more data sectors fail to decode (e.g., cause a read error), an error recovery process can be initiated data sector by data sector. The weight ratio of a failed sector $\omega_f$ is calculated and saved during the initial read, and a reference value $\omega_{track}$ can be calculated for the data track. A comparison between $\omega_f$ and $\omega_{track}$ can be used to detect the direction the read/write head should be adjusted toward. Once the direction is determined, the servo control system can apply a predetermined universal offset value (e.g., ±5-15% such as ±10%) and adjust the read/write head accordingly before re-reading the data track.

In certain embodiments, the offset direction and value are estimated based on weight ratios and beta values.

Figure 11:
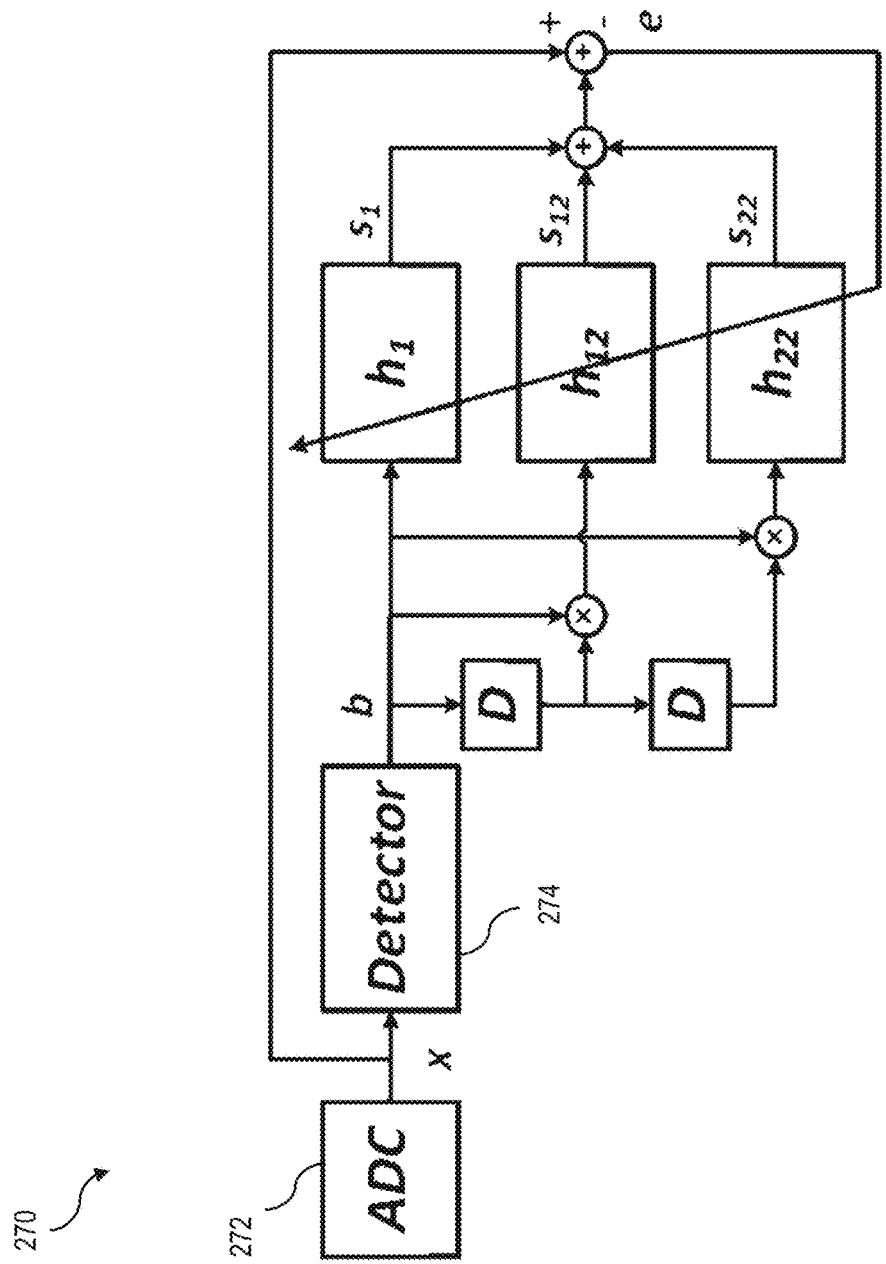
FIG. 11 shows a schematic of an approach for using PES to calculate a proxy value for read offset, in accordance with certain embodiments of the present disclosure.

FIG. 11 shows a schematic 270 that demonstrates an approach for using PES to calculate proxy values for read offsets (e.g., offset or misaligned data sectors along a data track). In short, the proxy value is extracted from PES and used to determine an offset direction and/or an offset amount. In the discussion below, the proxy value is represented by beta (β). In certain embodiments, the PES is generated from reading (or attempting to read) data sectors 162 as opposed to servo sectors 150.

PES can be generated by utilizing finite length Volterra series representation of the read signals. FIG. 11 demonstrates how 1st and 2nd order Volterra kernel coefficients can be extracted from samples of read signals respectively generated by the first and second read transducers 164A and 164B. Samples of the read signal are first processed by the analog-to-digital converter (ADC) 272 and sent to a detector 274. U.S. Pat. No. 7,885,025 describes calculating PES by utilizing finite length Volterra series representation of the read signals and is hereby incorporated by reference for that purpose.

Assuming a system with memory length of K, the coefficients of the 1st order kernel $h_1$ can be represented by $s_1^1$, $s_2^1, s_3^1, \ldots, s_K^1$, and the coefficients of the 2nd order kernels $h_{12}$ and $h_{22}$ can be represented by $s_1^{12}, s_2^{12}, s_3^{12}, \ldots, s_K^{12}$ and $s_1^{22}, s_2^{22}, s_3^{22}, \ldots, s_K^{22}$, respectively, for each of first and second read transducers 164A and 164B. The amplitude of the PES of each read transducer generated from these kernel coefficients contains information about the read offset for each read transducer. More specifically, the sum of the 2nd order coefficients, beta β, defined as follows is proportional to the read offset value for a given read transducer:

$$\beta = \sum_{i=1}^{K}(s_i^{12} + s_i^{22}) \quad (3)$$

Beta β values can be calculated for each individual read transducer. Because of skew angles of the read transducers in dual-transducer embodiments, one or both read transducers can be positioned far off-track, at least in certain zones. To help address the varying skew angles across the magnetic recording media, the signals generated by the read transducers can be weighted and combined.

The two read transducers are usually located on opposite sides of the zero offset (e.g., center) where the read/write head would be optimally located. If only looking at the positive (r>0%) or the negative (r<0%) region, there is a linear relationship between beta β and read offset, r, for individual read transducers. These two linear relationships are shown in FIG. 12.

Figure 12:
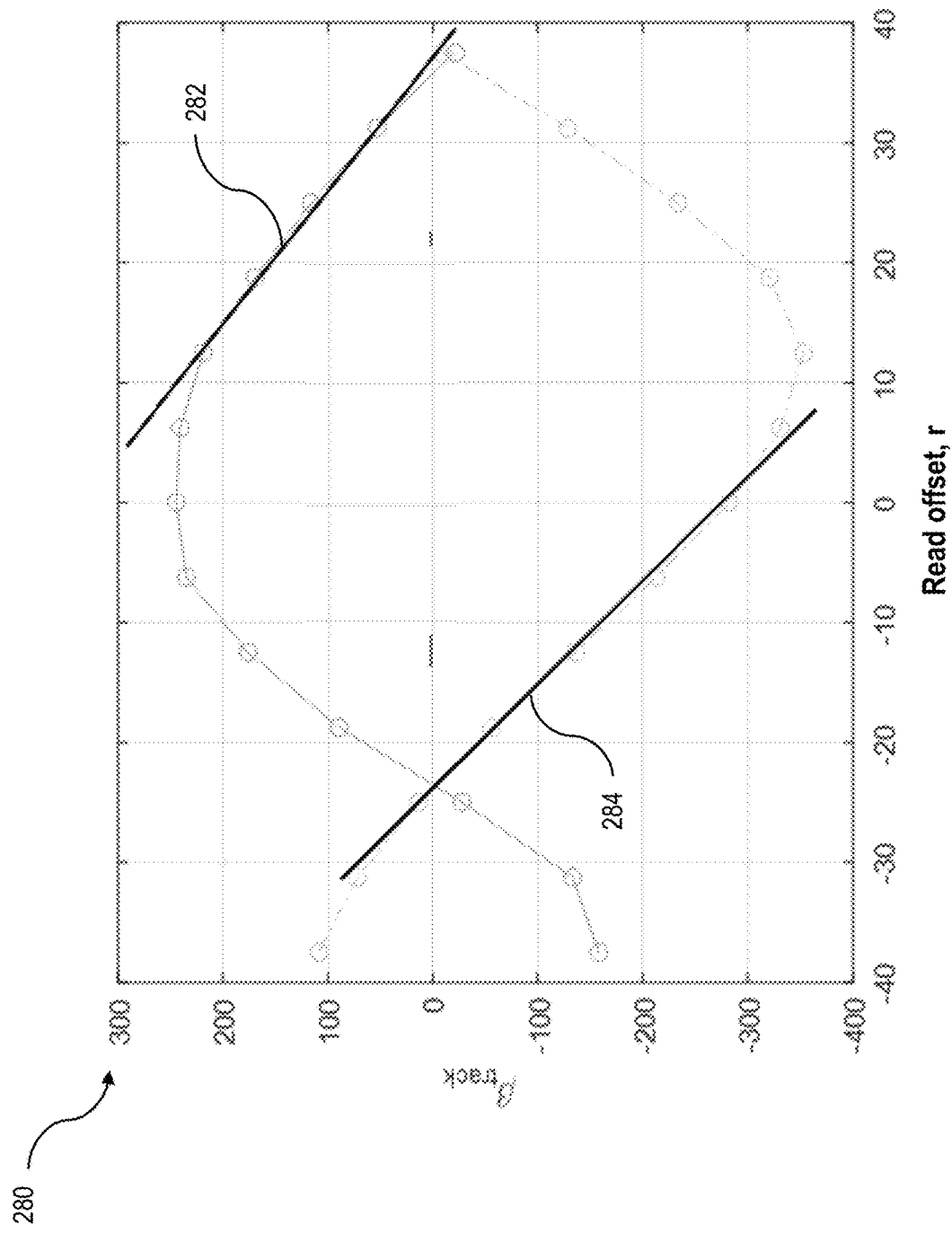
FIG. 12 shows a graph of plots of weight ratio values, beta values, and read offset values, in accordance with certain embodiments of the present disclosure.

FIG. 12 shows a graph 280 of example data points showing a correlation between Beta values on the y-axis and read offsets, r, on the x-axis. As shown in FIG. 12, there are two slopes 282 and 284, which represent the respective linear relationships between beta and read offsets.

For each negative or positive side, a linear regression model can be derived between the corresponding $\beta_{track}$ (equation (4) below) and read offset values.

$$\beta_{track}^r = \frac{1}{N}\sum_{s=1}^{N}\beta_{sector}^{(s,r)} \quad (4)$$

For example, for r≥0%, a linear regression model is derived by using $(r_+, \beta_{track,+}^0)$, where $r_+$ represents the non-negative read offset values and $\beta_{track,+}^0$ represents the corresponding β value from the first read transducer. The first linear model is then given by:

$$r=a_+*\beta+b_+ \quad (5)$$

where $a_+$ and $b_+$ are the slope and intercept respectively. Similarly for r<0%, a linear regression model can be derived using $(r_-,\beta_{track,-}^1)$, where $r_-$ represents the non-negative read offset values and $\beta_{track,-}^1$ represents the corresponding β value from the second read transducer. The second linear model is defined by:

$$r=a_-*\beta+b_- \quad (6)$$

Both $(a_+, b_+)$ and $(a_-, b_-)$ can be calibrated during manufacturing of the data storage device and stored on memory of the data storage device.

Figure 13:
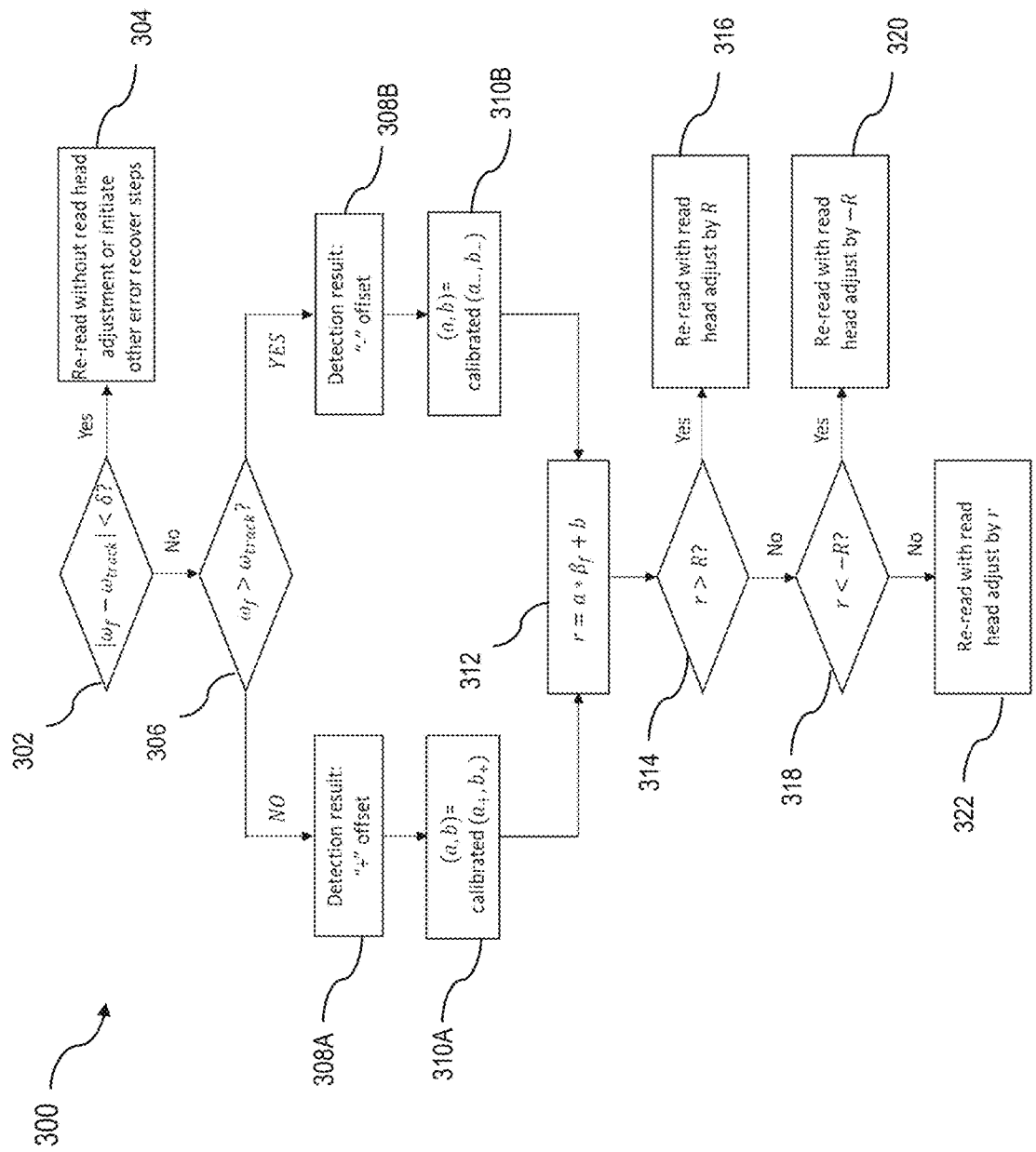
FIGS. 13-15 show various flowcharts of methods, in accordance with certain embodiments of the present disclosure.

FIG. 13 outlines an error recovery process 300 that can be carried out when an error is detected. The process 300 estimates read offset values using both weight ratio and β.

In block 302, the difference between the weight ratio of a failed data sector, $\omega_f$, and the average weight ratio of the data track, $\omega_{track}$ is determined and compared to a threshold value (denoted as δ in FIG. 13). If the difference is less than the threshold value, then the read transducers can re-read the failed data sector without attempting to determine a read offset value (block 304 in FIG. 13). In this instance, if the difference is less than a threshold value, this may indicate that the read error was caused by an issue other than the data sector being misaligned such as by non-repeatable noise. In such instances, other error recovery approaches can be attempted.

If the difference between the weight ratio of a failed data sector, $\omega_f$, and the average weight ratio of the data track, $\omega_{track}$, is greater than the threshold value, it can be determined whether the weight ratio if greater or less than the average weight ratio of the data track (block 306 in FIG. 13). If the failed data sector's weight ratio, $\omega_f$, is less than the average weight ratio, $\omega_{track}$, block 308A determines a positive offset and block 310A selects calibration values associated with the positive offset. If the failed data sector's weight ratio, $\omega_f$, is greater than the average weight ratio, $\omega_{track}$, block 308B determines a positive offset and block 310B selects calibration values associated with the negative offset.

The selected calibration values can then be used—along with the beta values of one of the read transducers—to determine the read offset value, r, (block 312 in FIG. 13). The determined read offset value can be then compared to maximum and minimum read offset values. For example, in block 314, the read offset value, r, is compared to a maximum read offset value, R. If the read offset value is greater than the maximum read offset value, then the read/write head is adjusted by the maximum read offset value for re-reading the data track with the failed data sector (block 316 in FIG. 13). In block 318, the read offset value, r, is compared to a minimum read offset value, −R. If the read offset value is less than the minimum read offset value, then the read/write head is adjusted by the minimum read offset value for re-reading the data track with the failed data sector (block 320 in FIG. 13).

If the determined read offset value, r, is neither greater nor less than the respective maximums and minimums, the read/write head is adjusted by the determined read offset value, r, for re-reading the data track with the failed data sector (block 322 in FIG. 13).

Figure 14:
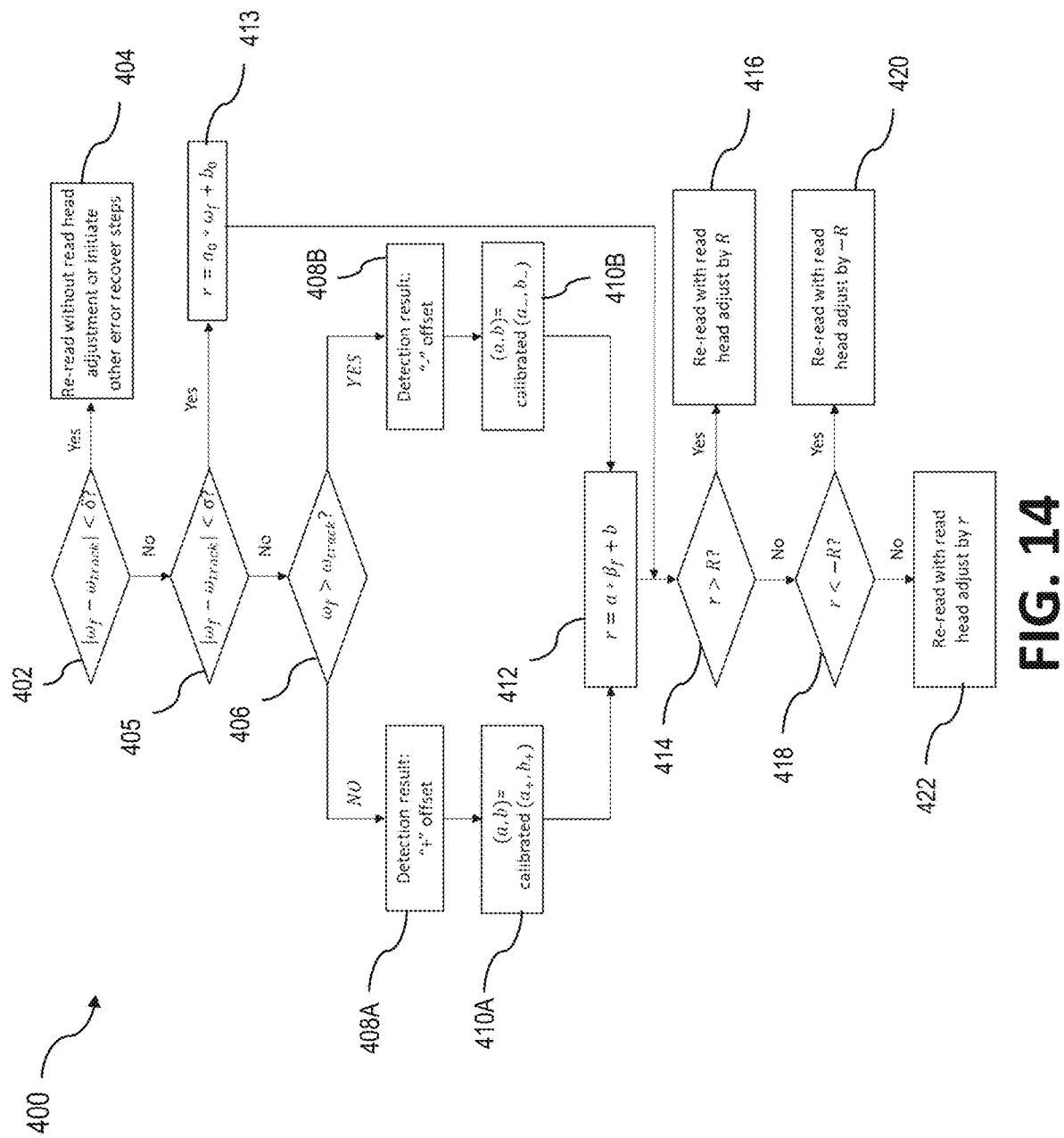

FIG. 14 outlines another error recovery process 400 that can be carried out when an error is detected. The process 400 utilizes another linear regression model derived for $|\omega - \omega_{track}| < \sigma$:

$$r=a_0*\omega+b_0 \quad (7)$$

where σ>0 defines a range near an optimal head location. In short, if $\omega_f$ of a failed data sector is within this range but also significant ($|\omega - \omega_{track}| \geq \delta$), the linear regression model in equation (7) is used to estimate the read offset. Otherwise, the process 300 of FIG. 13 can be used.

As further background for the process 400 of FIG. 14, for certain zones of the magnetic recording media, one or both of the reader transducers are typically positioned near to the zero offset position (e.g., the center of the data track). If only one read transducer is close to the center of the data track, that read transducer can be chosen to calibrate the linear regression model between beta values, and read offset values. This model is then used to estimate the read offset value. If both read transducers are close the track center, linear models for both read transducers can be used to estimate read offset values. One example to combine both read transducers is to estimate read offset value with each individual model and then average the results. Due to the linearity/monotonicity between weight ratio and read offset values, a linear regression model can be derived between weight ratio and read offset, and then used for read offset estimation. In this case, the read offset is estimated using weight ratio values only.

Referring back to FIG. 14, in block 402, the difference between the weight ratio of a failed data sector, $\omega_f$, and the average weight ratio of the data track, $\omega_{track}$ is determined and compared to a first threshold value (denoted as δ in FIG. 14). If the difference is less than the threshold value, then the read transducers can re-read the failed data sector without attempting to determine a read offset value (block 404 in FIG. 14).

Next, in block 405, the difference between the weight ratio of a failed data sector, $\omega_f$, and the average weight ratio of the data track, $\omega_{track}$ is determined and compared to a second threshold value (denoted as σ in FIG. 14). If the difference is less the second threshold value, the process 400 continues with certain steps outlined above for the process 300 of FIG. 13.

If the difference between the weight ratio of a failed data sector, $\omega_f$, and the average weight ratio of the data track, $\omega_{track}$, is greater than the threshold value, it can be determined whether the weight ratio if greater or less than the average weight ratio of the data track (block 406 in FIG. 14). If the failed data sector's weight ratio, $\omega_f$, is less than the average weight ratio, $\omega_{track}$, block 408A determines a positive offset and block 410A selects calibration values associated with the positive offset. If the failed data sector's weight ratio, $\omega_f$ is greater than the average weight ratio, $\omega_{track}$, block 408B determines a positive offset and block 410B selects calibration values associated with the negative offset.

The selected calibration values can then be used—along with the beta values of one of the read transducers—to determine the read offset value, r, (block 412 in FIG. 14). However, if during the comparison in block 405 it is determined that the difference is greater than the second threshold value, the read offset value is calculated using a different equation shown in block 413.

The determined read offset value—whether using the equation of block 412 or block 413—can be then compared to maximum and minimum read offset values. For example, in block 414, the read offset value, r, is compared to a maximum read offset value, R. If the read offset value is greater than the maximum read offset value, then the read/write head is adjusted by the maximum read offset value for re-reading the data track with the failed data sector (block 416 in FIG. 14). In block 318, the read offset value, r, is compared to a minimum read offset value, –R. If the read offset value is less than the minimum read offset value, then the read/write head is adjusted by the minimum read offset value for re-reading the data track with the failed data sector (block 420 in FIG. 14).

If the determined read offset value, r, is neither greater nor less than the respective maximums and minimums, the read/write head is adjusted by the determined read offset value, r, for re-reading the data track with the failed data sector (block 422 in FIG. 14).

Figure 15:
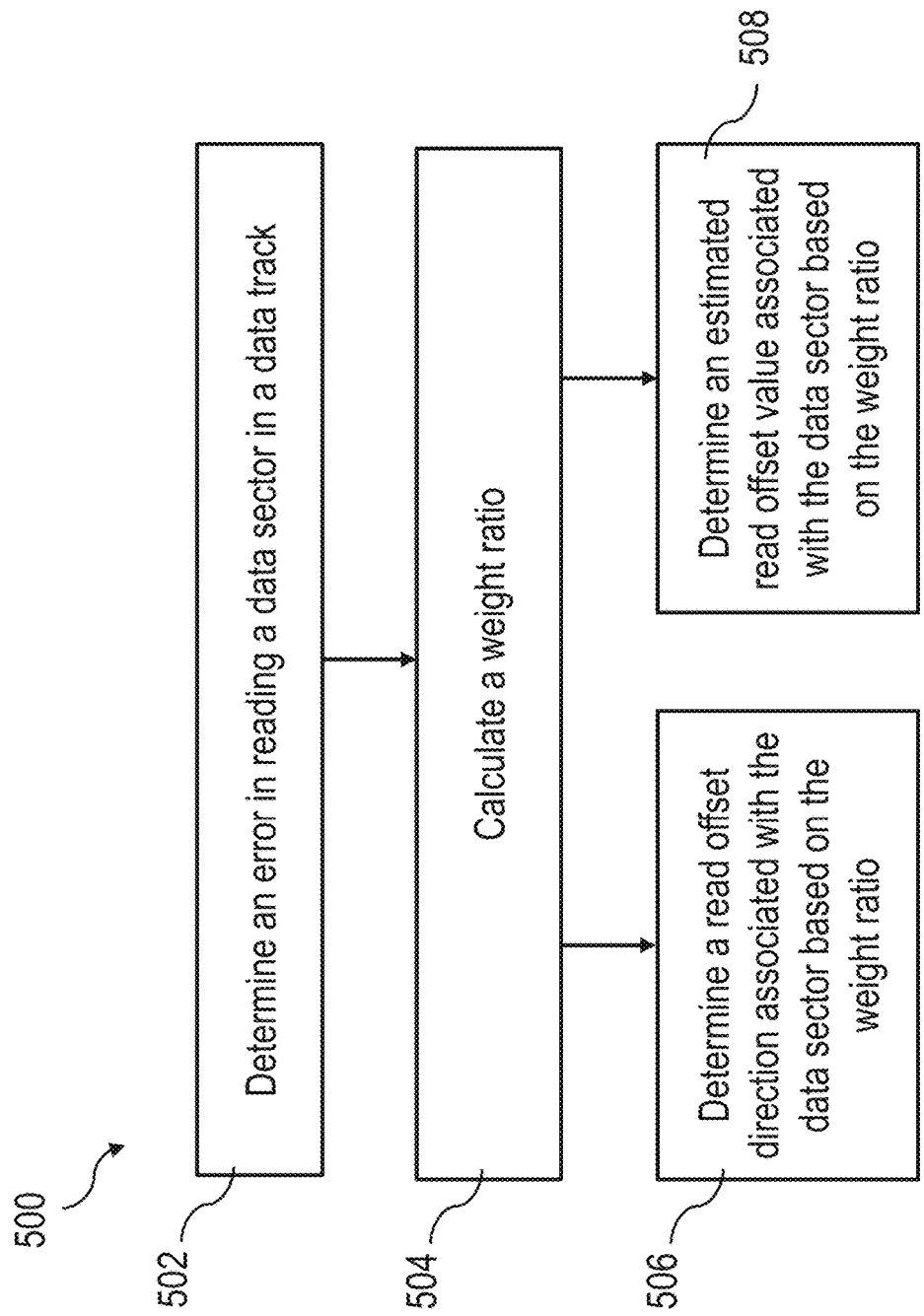

FIG. 15 outlines a method 500 for recovering data from missed data sectors. The method 500 includes determining an error after attempting to read, via a first read transducer and a second read transducer, a data sector in a first data track (block 502 in FIG. 15). The method further includes calculating a weight ratio associated with the data sector (block 504 in FIG. 15). In some embodiments, the calculated weight ratio is used to determine a read offset direction associated with the data sector (block 506 in FIG. 15). In other embodiments, the calculated weight ratio is used to determine an estimated read offset value associated the data sector (block 508 in FIG. 15).

The various processes described above can be carried out by the SOC 110 (shown in FIG. 1). More specifically, calculating the various β values and weight ratios can be carried out by the read/write channel 120A or 120B associated with the read/write head 104A or 104B being used to read data from the magnetic recording medium 106. As noted above, the weight ratio values can be considered to be read offset proxy values and can be calculated on a data sector-by-sector basis and compared to an average weight ratio value for that data track. Instead of stopping a read command when an error is detected, the remaining data sectors can be read such that more weight ratio values can be calculated (and averaged) and potentially other failed data sectors can be detected.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A method comprising:
   determining an error after attempting to read, via a first read transducer and a second read transducer, a data sector in a first data track;
   calculating a weight ratio associated with the data sector; and
   determining a read offset direction of the data sector based, at least in part, on comparing the calculated weight ratio to an average of weight ratio values of data sectors of the first data track.

2. The method of claim 1, further comprising:
   calculating a position error signal associated with the data sector; and
   determining a read offset value based, at least in part, on the calculated position error signal.

3. The method of claim 2, wherein the read offset value is based, at least in part, on a kernel coefficient extracted from the position error signal.

4. The method of claim 2, further comprising:
   determining that the read offset value is greater than a minimum read offset value and less than a maximum read offset value; and
   adjusting a read/write head position, based on the read offset value, in response to the determining that the read offset value is greater than the minimum read offset value and less than the maximum read offset value.

5. The method of claim 1, further comprising:
   determining a read offset value based, at least in part, on the calculated weight ratio.

6. The method of claim 1, further comprising:
   adjusting a radial position of a read/write head in response to a determined read offset direction; and
   re-reading the data track after the adjusting the radial position using the first read transducer and the second read transducer.

7. An apparatus comprising:
   a hard disk drive that includes:
      a magnetic recording medium comprising data sectors along a data track;
      a read/write head including a first read transducer and a second read transducer; and
      an integrated circuit including circuitry programmed to:
         calculate a weight ratio that is (1) associated with a first data sector and (2) based on signals generated by the first read transducer and the second read transducer while reading user data,
         calculate a read offset value based on a position error signal, and
         cause adjustment of a position of the read/write head based, at least in part, on the calculated weight ratio and the calculated read offset value, wherein the calculated ratio affects a direction of the adjustment, wherein the calculated read offset value affects a distance of the adjustment.

8. The apparatus of claim 7, wherein a centerline of the first data sector is offset from a centerline of the data track.

9. The apparatus of claim 7, wherein the circuitry is programmed to: determine a read offset direction based on comparing the calculated weight ratio to a reference value.

10. The apparatus of claim 9, wherein the reference value is an average weight ratio for the data track.

11. The apparatus of claim 9, wherein the adjustment of the position of the read/write head is used when re-reading the first data sector.

12. The apparatus of claim 9, wherein the calculated weight ratio is a number between 0 and 1.

13. A system-on-a-chip (SOC) comprising:
    a read/write channel configured to:
        calculate a weight ratio for data sectors of a data track,
        detect an error in reading a first data sector of the data sectors,
        calculate an average weight ratio for the data sectors of the data track, and
        compare the calculated average weight ratio to the calculated weight ratio associated with the first data sector; and
    a servo controller configured to:
        cause adjustment of a position of a read/write head in response to the comparison.

14. The SOC of claim 13, wherein the read/write channel is configured to determine a read offset value based on a calculated position error signal associated with the first data sector, wherein the servo controller is configured to cause adjustment of the position of the read/write head in response to the determined read offset value.

15. The SOC of claim 14, wherein the determined read offset value is based, at least in part, on a kernel coefficient extracted from the calculated position error signal.

16. The SOC of claim 13, wherein the servo controller is configured to cause adjustment of the position of the read/write head to a value that is at or between a predetermined minimum offset distance and a predetermined maximum offset difference.

17. The SOC of claim 13, wherein the weight ratio is a number between 0 and 1.

18. The SOC of claim 13, wherein the adjustment is used when re-reading the first data sector.

* * * * *